US007679799B2

(12) United States Patent
Kasazumi et al.

(10) Patent No.: US 7,679,799 B2
(45) Date of Patent: Mar. 16, 2010

(54) ILLUMINATING LIGHT SOURCE INCLUDING A LIGHT INTENSITY MODULATOR THAT OSCILLATES A LIGHT FROM A COHERENT LIGHT SOURCE IN A NON-INTEGRAL MULTIPLE OF ONE CYCLE AND TWO- DIMENSIONAL IMAGE DISPLAY USING THE SAME

(75) Inventors: Ken'ichi Kasazumi, Takatsuki (JP); Kiminori Mizuuchi, Neyagawa (JP); Kazuhisa Yamamoto, Takatsuki (JP)

(73) Assignee: Panasonic Corporation, Osaka (JP)

( * ) Notice: Subject to any disclaimer, the term of this patent is extended or adjusted under 35 U.S.C. 154(b) by 929 days.

(21) Appl. No.: 10/568,681

(22) PCT Filed: Feb. 24, 2005

(86) PCT No.: PCT/JP2005/002990

§ 371 (c)(1),
(2), (4) Date: Feb. 17, 2006

(87) PCT Pub. No.: WO2005/083492

PCT Pub. Date: Sep. 9, 2005

(65) Prior Publication Data
US 2008/0170285 A1 Jul. 17, 2008

(30) Foreign Application Priority Data
Feb. 27, 2004 (JP) ............................. 2004-054094

(51) Int. Cl.
*G02B 26/08* (2006.01)
(52) U.S. Cl. ................................ 359/201.1; 359/199.1

(58) Field of Classification Search ......... 359/196–226, 359/196.1–226.3
See application file for complete search history.

(56) References Cited

U.S. PATENT DOCUMENTS
6,140,979 A * 10/2000 Gerhard et al. .................. 345/7

(Continued)

FOREIGN PATENT DOCUMENTS
JP          55-65940          5/1980

(Continued)

OTHER PUBLICATIONS
Charles E. Baker et al., "A Large-Screen, Real-Time, Display Technique", Proc. Society for Information Display, 6th Nati'l Symp., pp. 85-101 (1965).

(Continued)

*Primary Examiner*—Alessandro Amari
*Assistant Examiner*—Jennifer L. Doak
(74) *Attorney, Agent, or Firm*—Wenderoth, Lind & Ponack, L.L.P.

(57) ABSTRACT

In a laser display displaying a video by scanning a beam from a laser light source two-dimensionally on a screen, image quality is deteriorated markedly by speckle noises induced from coherency of the light source. A known method of oscillating the screen to remove the speckles has a problem that a large-scale device is necessary and the screen cannot be chosen without any restraint. A speckle pattern that is generated can be suppressed using a beam oscillating means that oscillates a light spot on the screen at a high speed, causing a viewer to perceive a time-mean image as not having speckle noises.

5 Claims, 7 Drawing Sheets

U.S. PATENT DOCUMENTS

| 2002/0114057 A1 | 8/2002 | Roddy et al. |
| 2003/0011751 A1 | 1/2003 | Sakata et al. |

FOREIGN PATENT DOCUMENTS

| JP | 61-267728 | 11/1986 |
| JP | 2002-72266 | 3/2002 |
| JP | 2002-344050 | 11/2002 |
| JP | 2003-21800 | 1/2003 |
| JP | 2003-255252 | 9/2003 |
| WO | 96/38757 | 12/1996 |

OTHER PUBLICATIONS

K. Mizuuchi et al., "Electric-field poling in Mg-doped $LiNbO_3$", Journal of Applied Physics, vol. 96, No. 11, Dec. 1, 2004, pp. 6585-6590.

* cited by examiner

ILLUMINATING LIGHT SOURCE INCLUDING A LIGHT INTENSITY MODULATOR THAT OSCILLATES A LIGHT FROM A COHERENT LIGHT SOURCE IN A NON-INTEGRAL MULTIPLE OF ONE CYCLE AND TWO- DIMENSIONAL IMAGE DISPLAY USING THE SAME

TECHNICAL FIELD

The present invention relates to an image display device using a laser light source, such as a TV receiver and a video projection device, and to an illumination light source to project an image.

BACKGROUND ART

FIG. 7 is a view schematically showing the configuration of a laser display in the related art described in detail, for example, in Non-Patent Document 1. Light beams from laser light sources 101a, 101b and 101c for three colors, RGB, are combined by dichroic mirrors 102a and 102b and mirror 107, sent through a light collection lens 109, and scanned in the horizontal direction by a polygon scanner 104 and in the vertical direction by a galvanometer scanner 105 to be irradiated onto a screen 108. In this instance, a video is displayed on the screen by modulating intensity by light modulators 106a through 106c according to an input video signal. For example, in order to display a moving image corresponding to an NTSC video signal, about 500 scan lines in the horizontal direction are displayed for 30 frames per second, and the number of horizontal scan lines in total is 15,000 per second. This can be achieved by rotating a polygon scanner having 30 faces at 30,000 rpm. The galvanometer mirror is oscillated to reciprocate in the vertical direction 30 times per second. The resolution in the horizontal direction is determined by a modulation rate of the light modulators with respect to the scan rate. For example, in order to obtain the resolution comparable to 500 TV lines in the horizontal direction at the scan rate specified above, a bandwidth of about 10 MHz is necessary on the basis of 500×15,000=7,500,000. Such a bandwidth can be achieved with a light modulator using the acousto-optic effect or a light modulator using the electro-optic effect.

The display configured in this manner is characterized in that it can display a sharp image having high color purity by using laser light sources having adequate wavelengths because light beams from the respective light sources for RGB are monochromatic light. Sharp color display of each monochromatic light can be achieved, for example, by using a krypton ion laser having a wavelength of 647.1 nm as the red light source, a helium-cadmium laser having a wavelength of 441.6 nm as the blue light source, and a second harmonic of a neodymium-doped YAG laser having a wavelength of 532 nm as the green light source.

The display configured as shown in FIG. 7, however, has a problem of so-called speckle noises resulting from the use of a highly coherent laser light source as the light source. The speckle noises are microscopic irregular noises induced by mutual interference of scattered light from the respective portions on the screen 108 as a laser beam scatters on the screen 108. The screen 108 has a random surface shape, and a laser beam scattered on the screen causes interference due to a microscopic concavoconvex shape, and generates a microscopic bright-dark pattern depending on a viewing direction. This pattern results in the speckle noises.

In the related art, the speckle noises are removed by oscillating the screen 108. This technique uses the fact that the speckle pattern changes as the interference state on the screen varies from time to time because the position of the screen keeps changing. The speckles do not disappear in every moment; however, the pattern changes at a high speed due to oscillation, and the viewer acknowledges the resulting time-mean pattern. The viewer therefore views an image as if the speckles had disappeared. The method of oscillating the screen as described above can indeed remove the speckles effectively from a viewed image; however, there is a need to use a special screen that can be oscillated. This raises a problem that a fixed wall surface, for example, cannot be used as the screen without any restraint.

Non-Patent Document 1: Baker et al., "A large screen real-time display technique", *Proc. Society for Information Display 6th Nati'l Symp.*, 85-101 (1965)

DISCLOSURE OF THE INVENTION

The invention therefore has an object to solve these problems and provide an illumination light source capable of effectively suppressing speckle noises specific to a case where a coherent light source, such as a laser light source, is used, and a 2-D image display device using this illumination light source and capable of displaying a high-quality video.

The above and other objects are achieved by a 2-D image display device according to one aspect of the invention, which includes: a coherent light source; 2-D beam scan means (2-D beam scanner) for scanning light from the coherent light source two-dimensionally; light intensity modulation means (light intensity modulator) for modulating the light from the coherent light source in intensity; and beam oscillation means (1-D beam scanner) for minutely oscillating the light from the coherent light source.

According to this aspect, light from the coherent light source is modulated in intensity by the light intensity modulation means according to, for example, an input video signal, and can be projected onto a certain wall or the like that functions as a screen. The projected light is scanned on the screen two-dimensionally by the 2-D beam scan means having a combination selected from, for example, a polygon scanner, a galvanometer scanner, etc. In this instance, the projected light is oscillated minutely by the beam oscillation means, and thereby irradiates different sites on the screen successively. The pattern of the speckle noises induced by scattered light therefore changes one after another as well. This allows the time-mean pattern of the speckle noises to be perceived by human eyes. It is thus possible to display a high-quality video in which the speckle noises specific to a device using a coherent light source, such as a laser light source, can be suppressed effectively.

Also, an illumination light source according to another aspect of the invention includes: a coherent light source; beam scan means for scanning light from the coherent light source; light intensity modulation means for modulating the light from the coherent light source in intensity; and beam oscillation means for minutely oscillating the light from the coherent light source.

According to this aspect, light from the coherent light source is modulated in intensity by the light modulation means according to, for example, an input video signal, and projected onto a certain screen or the like. In this instance, the beam scan means can be configured to scan the light either one-dimensionally or two-dimensionally. In the case of the configuration to scan the light one-dimensionally, by providing a mechanism that scans light in a direction orthogonal to the scan direction to the outside, it is possible to display an image, for example, on a 2-D screen.

Also, projected light is oscillated minutely by the beam oscillation means, and thereby irradiates different sites on the screen successively. The pattern of the speckle noises induced by scattered light therefore changes one after another as well. This allows the time-mean pattern of the speckle noises to be perceived by human eyes. It is thus possible to achieve a light source capable of displaying a high-quality video in which the speckle noises specific to a device using a coherent light source, such as a laser light source, can be suppressed effectively.

BEST MODE FOR CARRYING OUT THE INVENTION

Hereinafter, embodiments of the invention will be described with reference to the drawings.

First Embodiment

Figure 1:
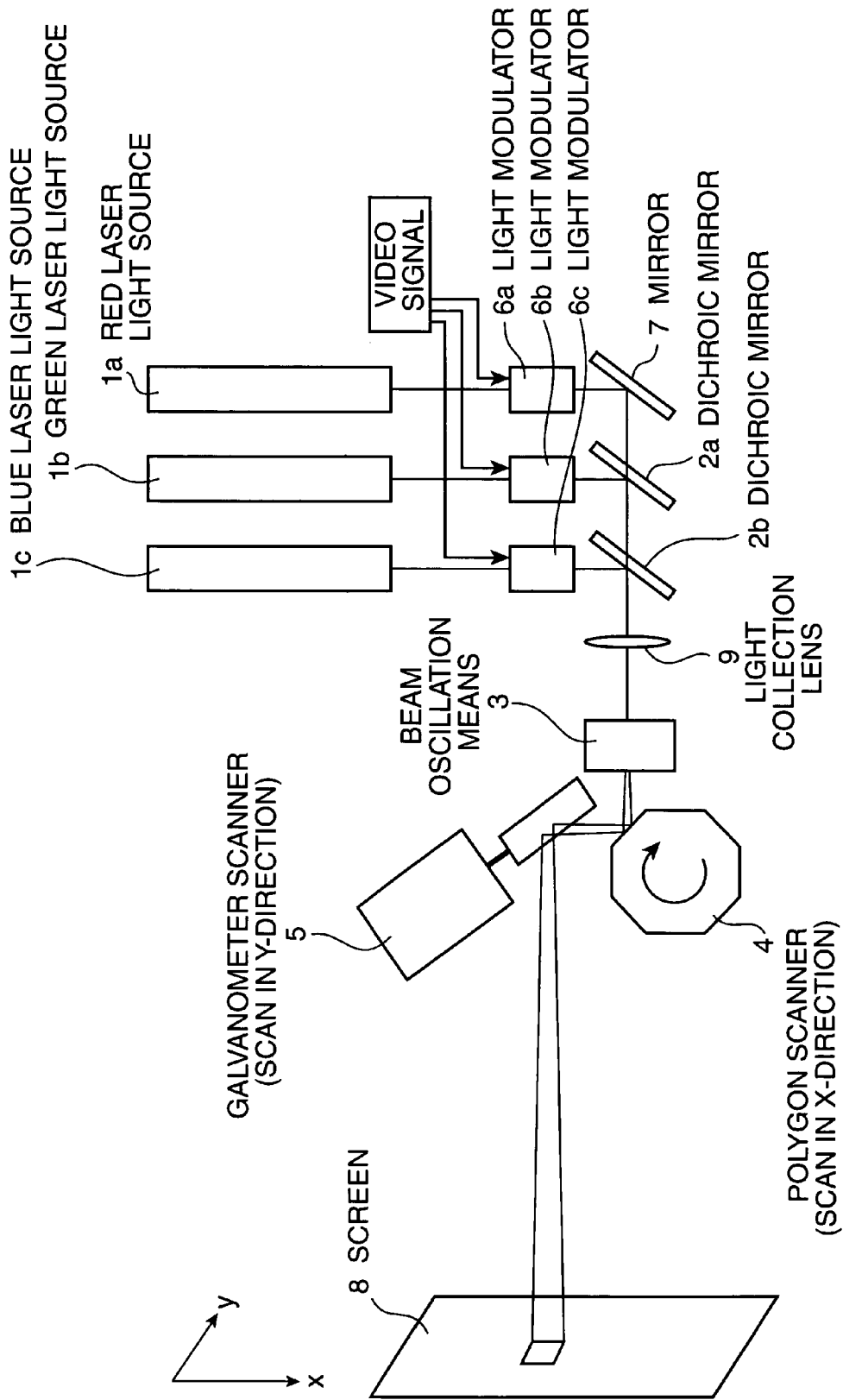
FIG. 1 is a view schematically showing the configuration of a first embodiment of a 2-D image display device of the invention.

FIG. 1 is a view schematically showing the configuration of a 2-D image display device of the invention. Light beams emitted from a red laser light source 1a, a green laser light source 1b, and a blue laser light source 1c are modulated, respectively, by light modulators 6a, 6b, and 6c that modulate light according to a video signal, and then combined by dichroic mirrors 2a and 2b and mirror 7. Further, a light beam is deflected in the x-direction (horizontal scan) by a polygon scanner 4 and subsequently deflected in the y-direction (vertical scan) by a galvanometer scanner 5 to be projected onto a screen 8 in the form of a 2-D image. In this instance, light beams modulated by the light modulators 6a through 6c are oscillated minutely on the screen 8 by beam oscillation means 3. In this instance, the beam on the screen is collected by a light collection lens 9 to form a minute light spot. The size of the light spot is smaller than oscillation amplitude on the screen 8 by the beam oscillation means 3.

In this embodiment and second and third embodiments below, a combination selected from the polygon scanner 4 and the galvanometer scanner 5 is furnished with a function of 2-D beam scan means, the light modulators 6a through 6c are furnished with a function of light intensity modulation means, and the light collection lens 9 is furnished with a function of beam collection means.

An He—Ne laser and an AlGaInP-based semiconductor laser can be used as the red laser light source 1a. An Ar laser and an SHG laser using a YAG solid-state laser as the fundamental harmonic can be used as the green laser light source 1b. An He—Cd laser, a GaN-based semiconductor laser, and an SHG laser using a YVO4 solid-state laser as the fundamental harmonic can be used as the blue laser light source 1c.

Figure 2:
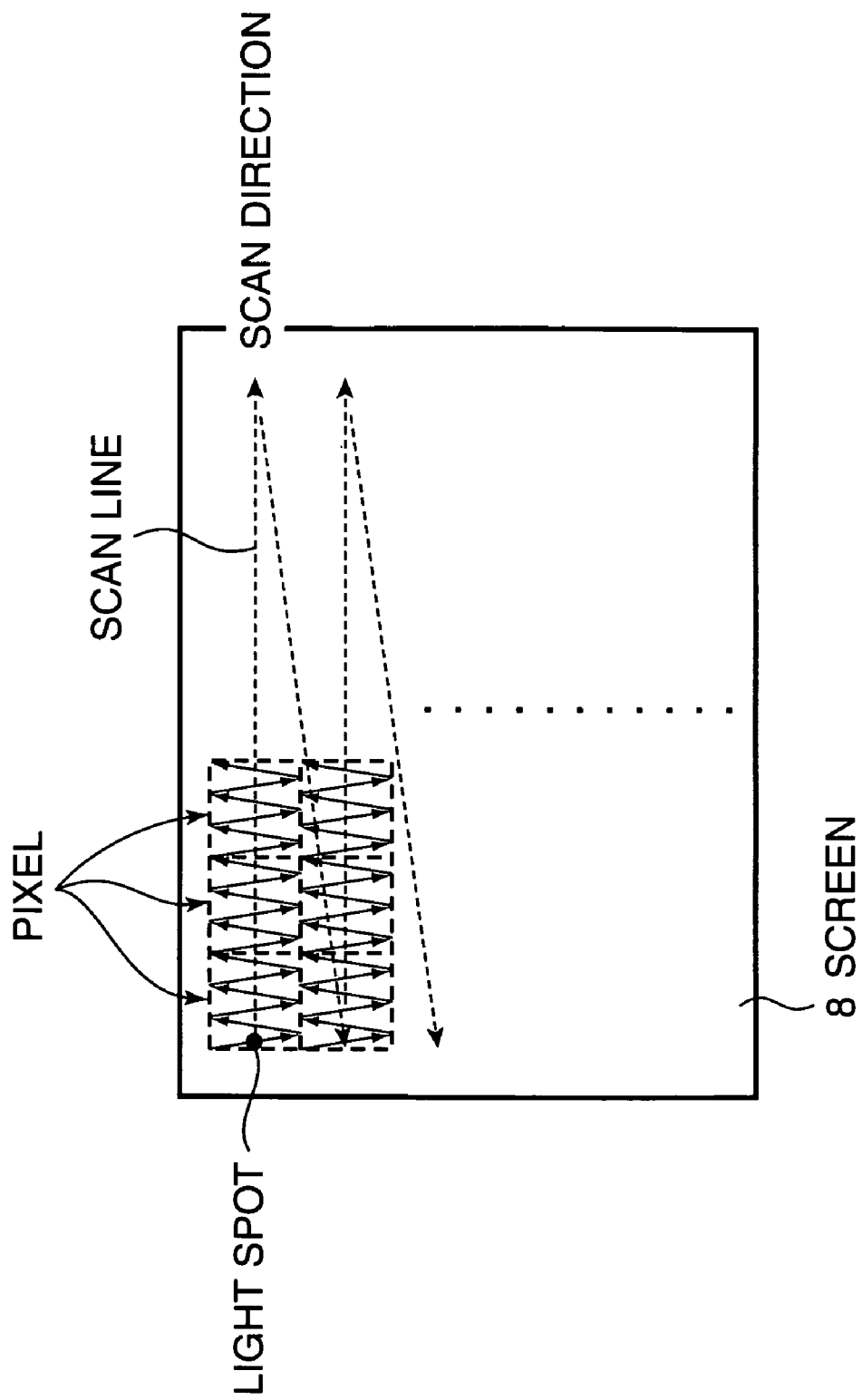
FIG. 2 is a view showing a scan method of an illumination beam in the first embodiment of the 2-D image display device of the invention.

A manner in which the speckle noises are suppressed will now be described using a scan pattern of a light spot on the screen 8. FIG. 2 is a view showing a manner in which a light spot is scanned on the screen 8. Light coming incident on the screen 8 is scanned as indicated by a dotted line by the polygon scanner 4 and the galvanometer scanner 5 as has been described above, so that it irradiates a rectangular region covering the entire screen 8 while being modulated in intensity according to a pixel at the scan position.

The pixel on the screen referred to herein means a region having, as one side in the longitudinal direction (vertical direction) of FIG. 2, a length equal to an interval between adjacent scan lines (in this embodiment, in the horizontal direction) scanned by the polygon scanner 4 and the galvanometer scanner 5, and having, as one side in the lateral direction (horizontal direction), a length in the scan line direction that is scanned by the polygon scanner 4 and the galvanometer scanner 5 for a time during which data corresponding to one pixel in an input video signal, which is a digital signal, is transmitted. In short, the pixel is defined herein by ignoring the light spot diameter.

Because a light spot is oscillated by the beam oscillation means 3 at a speed higher than by the polygon scanner 4 and the galvanometer scanner 5, it is oscillated at a high speed within a given pixel while this particular pixel is being displayed as is shown in FIG. 2. In this instance, minute concavity and convexity are present on the screen 8, and the light spot oscillates and thereby irradiates different sites in the concavoconvex pattern as the beam is oscillated minutely. The pattern of the speckle noises induced by scattering therefore changes as well at a high speed in association with oscillation of the beam. In other words, the speckle pattern viewed by the viewer while a given pixel is being displayed changes at a high speed, and this allows the time-mean speckle pattern to be perceived when the speckle patterns are viewed by human eyes. A video as if the speckle pattern had disappeared is thus acknowledged.

In order to suppress the speckles effectively, the speckles are changed at a higher speed while one pixel is displayed. This can be achieved by minutely oscillating a beam thoroughly and two-dimensionally within a pixel while an input video signal for this particular pixel is displayed, so that the beam irradiates more concavoconvex patters on the screen 8. However, by taking it into account that the respective pixels are scanned successively by the polygon scanner 4 while an image is displayed, as is shown in the drawing, it is possible to oscillate and scan a beam within a pixel two-dimensionally at a high speed by minutely oscillating the beam at a high speed one-dimensionally in a direction perpendicular to the scan direction of the polygon scanner 4. When configured in this manner, the beam oscillation means 3 only has to oscillate a beam in a one-dimensional direction. Oscillation can be thus achieved with a simple manipulation.

In order to suppress the speckles on the principle as above, a light spot diameter on the screen 8 needs to be smaller than the oscillation amplitude of a beam, and the concavity and convexity on the screen 8 that a light spot can sense need to change with oscillation of the beam. Also, it is necessary to prevent deterioration of image resolution by limiting the oscillation amplitude of a beam to a range smaller than one pixel of the video.

Figure 3:
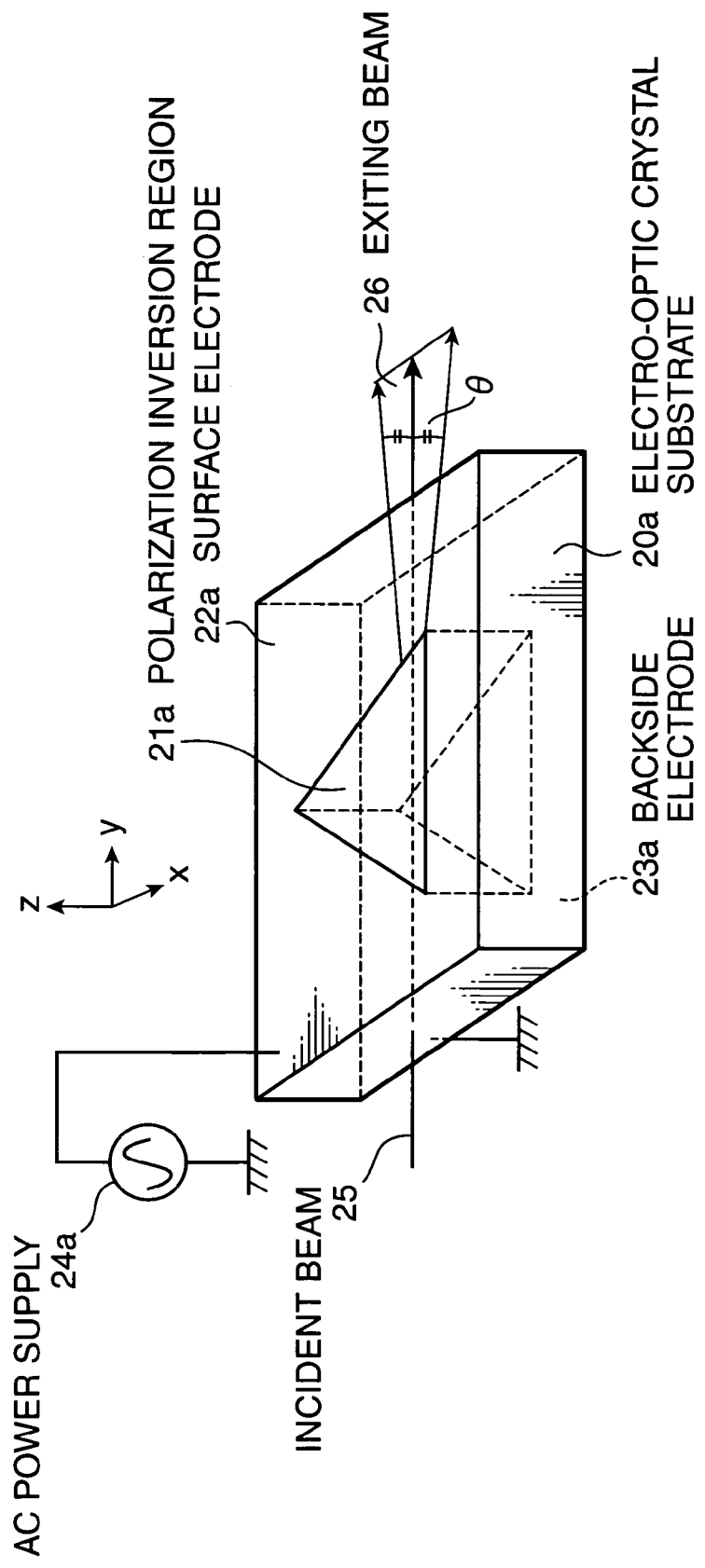
FIG. 3 is a view schematically showing beam oscillation means in the first embodiment of the 2-D image display device of the invention.

FIG. 3 is a view showing one example of the beam oscillation means 3 used in the 2-D image display device of the invention. According to the example of the drawing, a triangular polarization inversion region 21a is formed in an electro-optic crystal substrate 20a for a light beam to pass through. A refractive index of the electro-optic crystal substrate 20a varies when a voltage in the positive or negative direction of the z-axis is applied between a surface electrode 22a and a backside electrode 23a. In this instance, the refractive index of the polarization inversion region 21a varies inversely with respect to the other region within the electro-optic crystal substrate 20a. The polarization inversion region 21a therefore serves as a prism. Hence, assume that an incident direction of an incident beam 25 is the positive direction of the y-axis, then an exiting beam 26 is refracted to a specific one direction, which is either the positive or negative direction of the x-axis. In addition, when the direction of a voltage applied between the surface electrode 22a and the backside electrode 23a is inverted, the refractive index varies inversely with respect to the change above. The incident beam 25 is therefore refracted to a specific one direction, which is either the positive or negative direction of the x-axis and in a direction opposite to the direction refracted above.

In addition, by using an ac power supply 24a as the power supply that applies a voltage, it is possible to vary the refractive index at a high speed in response to the frequency of the ac power supply 24a. It is therefore possible to oscillate the incident beam 25 at a high frequency equivalent to the frequency of the ac power supply 24a. Further, by changing magnitude of an applied voltage, a refractive angle can be changed correspondingly. It is therefore possible to oscillate a beam at different oscillation angles. In short, when the ac power supply 24a is used, it is possible to oscillate a beam in a specific one-dimensional direction continuously at a high speed.

In an experiment, lithium niobate crystal was used as the electro-optic crystal, and the surface electrode 22a and the backside electrode 23a were formed by means of photolithography. The polarization inversion region 21a was formed by applying a voltage of 1 kV between these two electrodes. Both the crystal thickness and the polarization inversion region width were 1 mm, and it was possible to deflect a beam as large as 1 mm in diameter. For beam oscillation, a deflection angle (indicated by θ in FIG. 3) of 0.2 degree was obtained on an applied voltage of 20 V.

Also, the beam oscillation means 3 of FIG. 3 uses lithium niobate crystal, which is an electro-optic crystal. However, this crystal is often used also as a light wavelength conversion element due to its high non-linear constant. The wavelength conversion technique is useful also for the 2-D image display device of the invention. For example, by allowing infrared light of 1064 nm to go incident thereon and light of half the wavelength to exit therefrom, it is possible to obtain a green laser beam of 532 nm. In this instance, the number of components forming the light source and the beam oscillation means can be reduced by integrating the beam oscillation means 3 of FIG. 3 on the lithium niobate crystal used for wavelength conversion as will be described below. A laser light source using the wavelength conversion is characterized in that a light source more compact than a gas laser, such as an argon laser used in the related art, can be achieved. By exploiting such a characteristic, when a gallium nitride semiconductor laser light source and an AlGaInP semiconductor laser light source are used as blue and red coherent light sources, respectively, a compact 2-D image display device can be achieved. In this case, the speckle noises can be suppressed by integrating the beam oscillation means as described above. Also, because semiconductor laser light sources are used for red light and blue light, the coherency of laser beams is reduced by applying a high frequency current to an injection current for the semiconductor laser light sources, which can in turn reduce the speckles. By using the light source employing the wavelength conversion element and the semiconductor laser light source, integrating the beam oscillation means in the light source employing the wavelength conversion element, and applying a high frequency current to the injection current for the semiconductor laser in this manner, it is possible to reduce the overall device in size and reduce the number of components.

Of the optical systems shown in FIG. 1, a speckle evaluation optical system is constructed using the green laser light source 1b, the light collection lens 9, the beam oscillation means 3, the polygon scanner 4, the galvanometer scanner 5, and the screen 8, and suppression of the speckles was confirmed by performing an experiment as follows. The polygon scanner was an 8-faced mirror driven at 10,000 rpm, and the galvanometer scanner was driven on a triangular wave at 100 Hz. A distance from the light collection lens to the screen 8 was 3 m. It was confirmed that when no voltage was applied to the beam oscillation means 3, fine speckle noises were superimposed uniformly across an image, whereas the speckle patterns disappeared by applying a sine wave to the beam oscillation means at 1 MHz on ±20 V. The size of light on the screen 8 was about 100 μm, and the beam oscillation amplitude was about 1 mm.

In this experiment, a light deflector using the electro-optic effect was used as the beam oscillation means 3. However, a light deflector using the acousto-optic effect can be used as well. It should be noted, however, that because the light deflector using the acousto-optic effect deflects light by means of the grating inside the crystal, it is able to deflect light having a specific wavelength alone. Hence, when the light deflector using the acousto-optic effect is used, one light deflector is necessary for each color.

Second Embodiment

Figure 4:
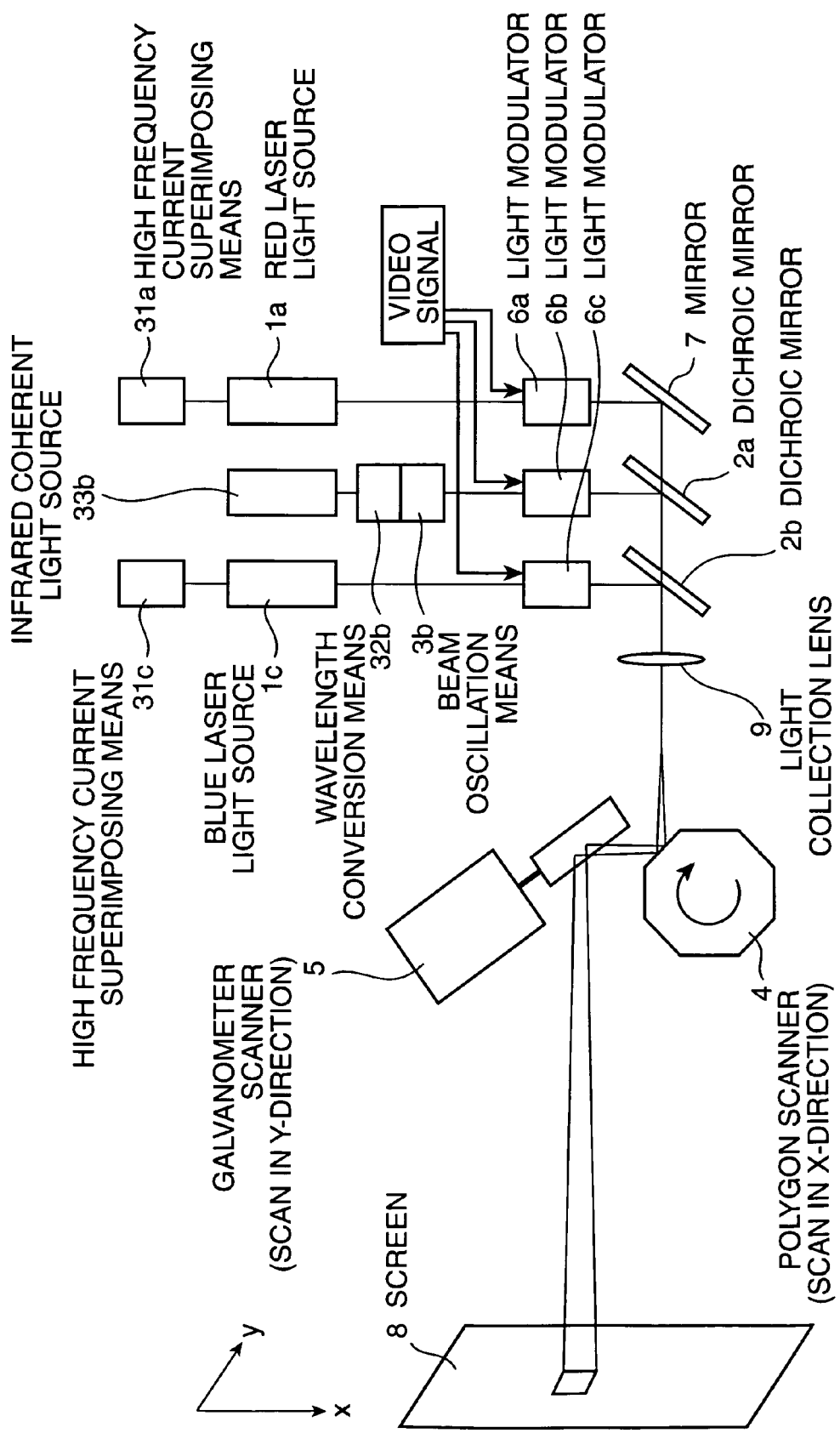
FIG. 4 is a view schematically showing a second embodiment of the 2-D image display device of the invention.

FIG. 4 is a view schematically showing the configuration of a second embodiment of the 2-D image display device of the invention. The first embodiment above is configured in such a manner that light beams emitted from the red laser light source 1a, the green laser light source 1b, and the blue laser light source 1c are combined first, and then oscillated by the beam oscillation means 3. Different from the above configuration, in this embodiment, an infrared coherent light source 33b and wavelength conversion means 32b are used as a green light source, and green light alone is oscillated by beam oscillation means 3b. For example, a YAG laser having a wavelength of 1064 nm is used as the infrared coherent light source 33b, and a second harmonic generator device, in which the lithium niobate substrate has a cyclic polarization inversion structure, is used as the wavelength conversion means 32b. The wavelength conversion means 32b allows light having half the wavelength of light coming incident thereon, herein green light having the wavelength of 532 nm, to exit. As will be described below, both the wavelength conversion means 32b and the beam oscillation means 3b are formed on the same lithium niobate substrate.

The red laser light source 1a is a semiconductor laser based on AlGaInP, and the blue laser light source 1c is a semiconductor laser based on GaN. High frequency currents from high frequency current superimposing means 31a and 31c are applied to currents for driving these light sources. In this instance, because laser beams emitted from the red laser light source 1a and the blue laser light source 1c expand in spectrum bandwidth, the coherency is reduced. As a result, speckle noises induced by scattering on the screen 8 can be suppressed. The high frequency current superimposing means 31a and 31c can be achieved by the method and the configuration same as those used normally to reduce noises induced by return light of the semiconductor laser light source that is used for an optical disc pick-up in the related art.

Figure 5:
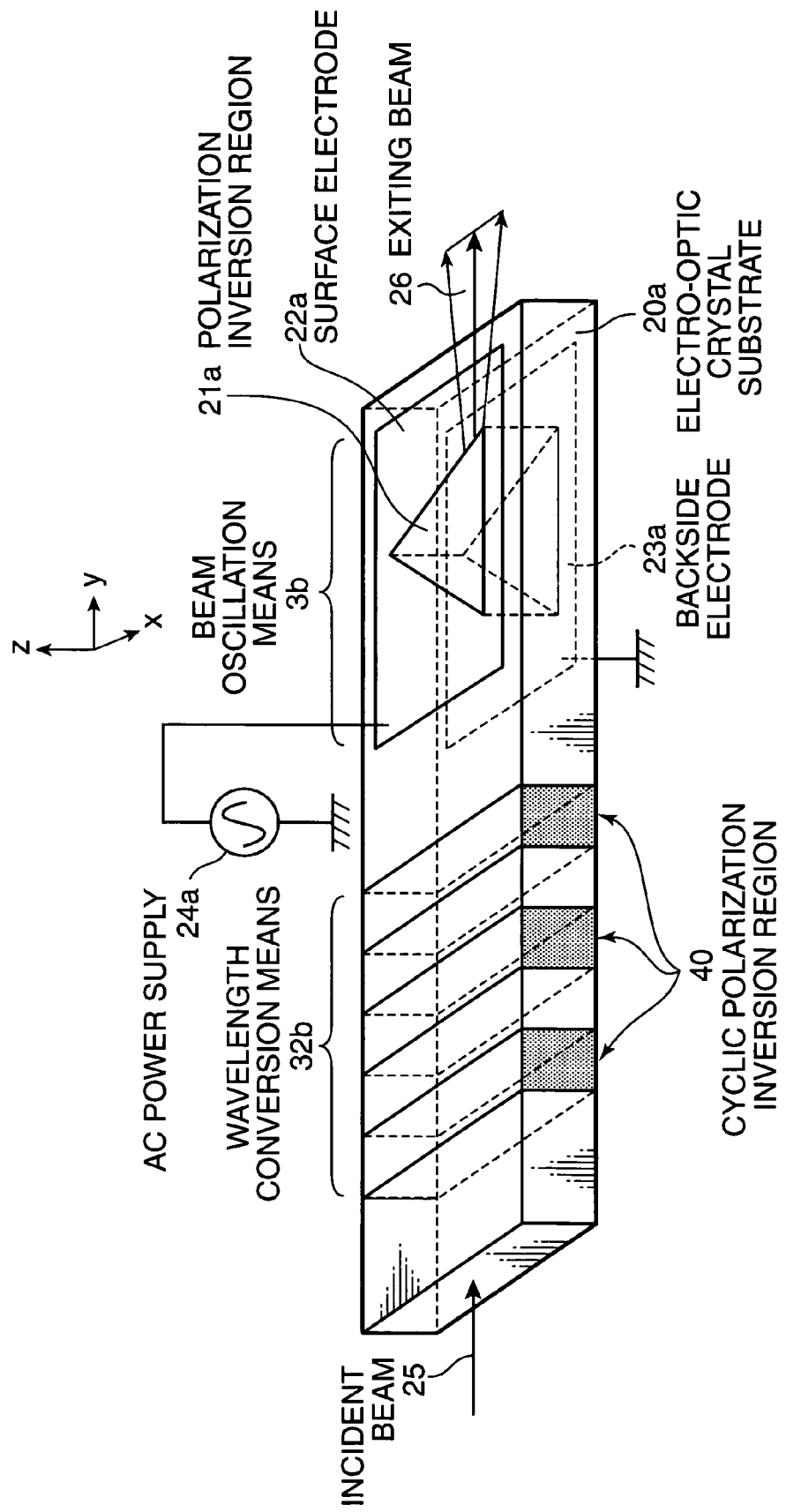
FIG. 5 is a view schematically showing one example in which wavelength conversion means using a second harmonic generator device and beam oscillation means are integrated into the same substrate.

FIG. 5 is a view schematically showing the configuration of one example in which wavelength conversions means using the second harmonic generator device and beam oscillation means are integrated into the same substrate. In the wavelength conversion means 32b, the directions of polarization are inverted in a cycle along the traveling direction of the incident beam 25. This structure is referred to as the cyclic polarization inversion structure. When coherent light comes incident on homogeneous lithium niobate having no polarization inversion, the phases of the second harmonics generated at respective portions in the electro-optic crystal plate 20a change due to wavelength dispersion. This makes highly efficient wavelength conversion impossible. On the contrary, in the device shown in FIG. 5, the cyclic polarization inversion structure compensates for wavelength dispersion of lithium niobate, so that the second harmonics generated at the respective portions in the crystal are added up in-phase. Highly efficient wavelength conversion is thus enabled. The wavelength conversion technique is described in detail in *Journal of Applied Physics*, Vol. 96, 2004, No. 11, 6865-6590.

A beam exiting from the wavelength conversion means 32b is oscillated in a one-dimensional direction by the adjacently integrated beam oscillation means 3b (see FIG. 3). In this instance, too, a beam can be oscillated in a specific one-dimensional direction (the positive or negative direction of the x-axis in FIG. 5) continuously at a high speed with the use of the ac power supply 24a as has been described with reference to FIG. 3.

As is shown in FIG. 5, by integrating the wavelength conversion means 32b and the beam oscillation means 3b into the same substrate, the number of components can be reduced. In addition, the cyclic polarization inversion region 40 and the polarization inversion region 21a in the beam oscillation means 3b can be formed by making electrodes of the same shapes as the respective polarization inversion regions and by applying a high voltage simultaneously. Hence, by integrating the beam oscillation means 3b and the wavelength conversion means 32b into the same substrate as in this embodiment, the steps in the fabrication sequence of the device can be fewer. According to the configuration of the second embodiment as has been described, it is possible to achieve a 2-D image display device capable of displaying a sharp color image in which the speckle noises are suppressed.

Third Embodiment

Figure 6:
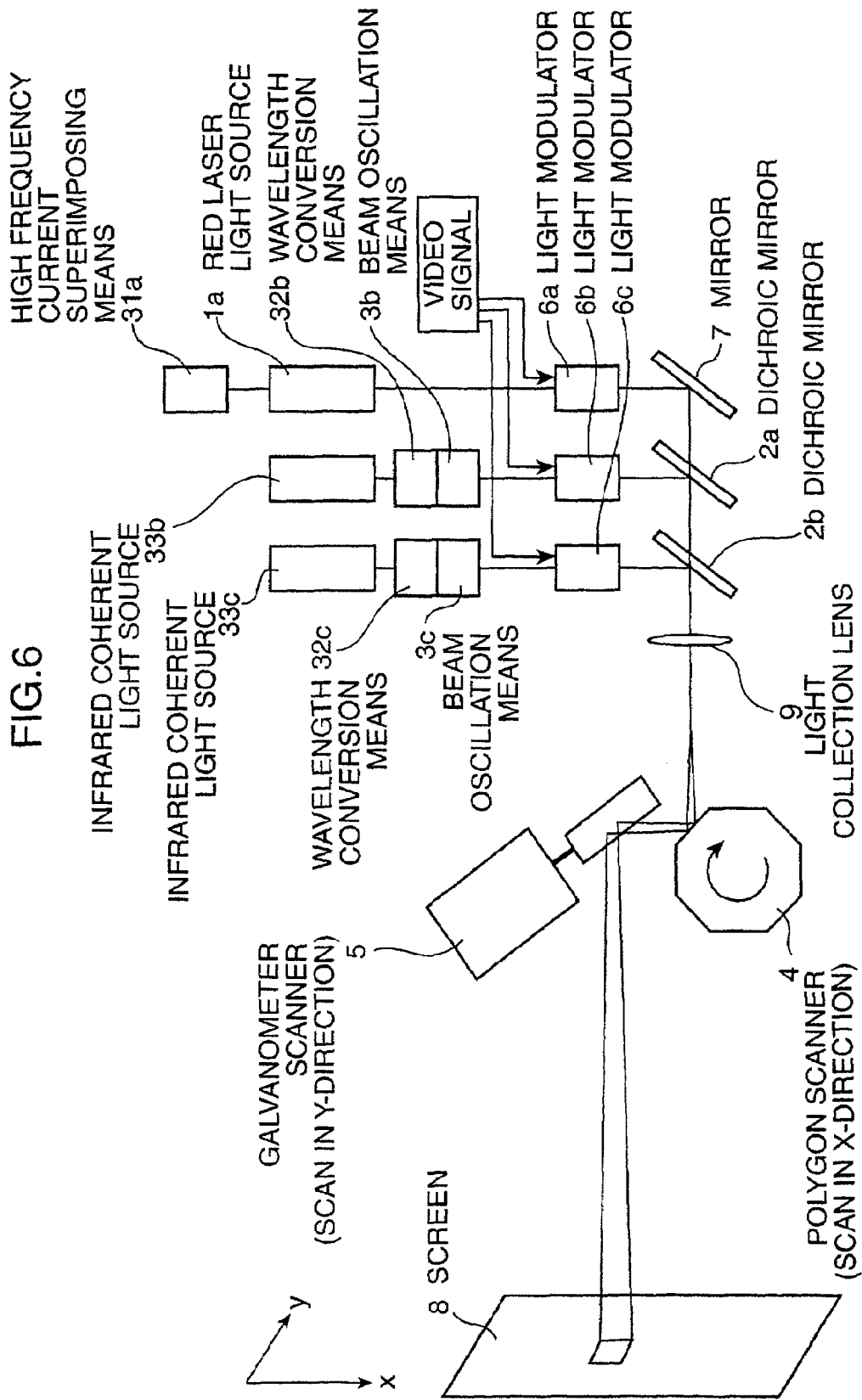
FIG. 6 is a view schematically showing the configuration of a third embodiment of the 2-D image display device of the invention.
Figure 7:
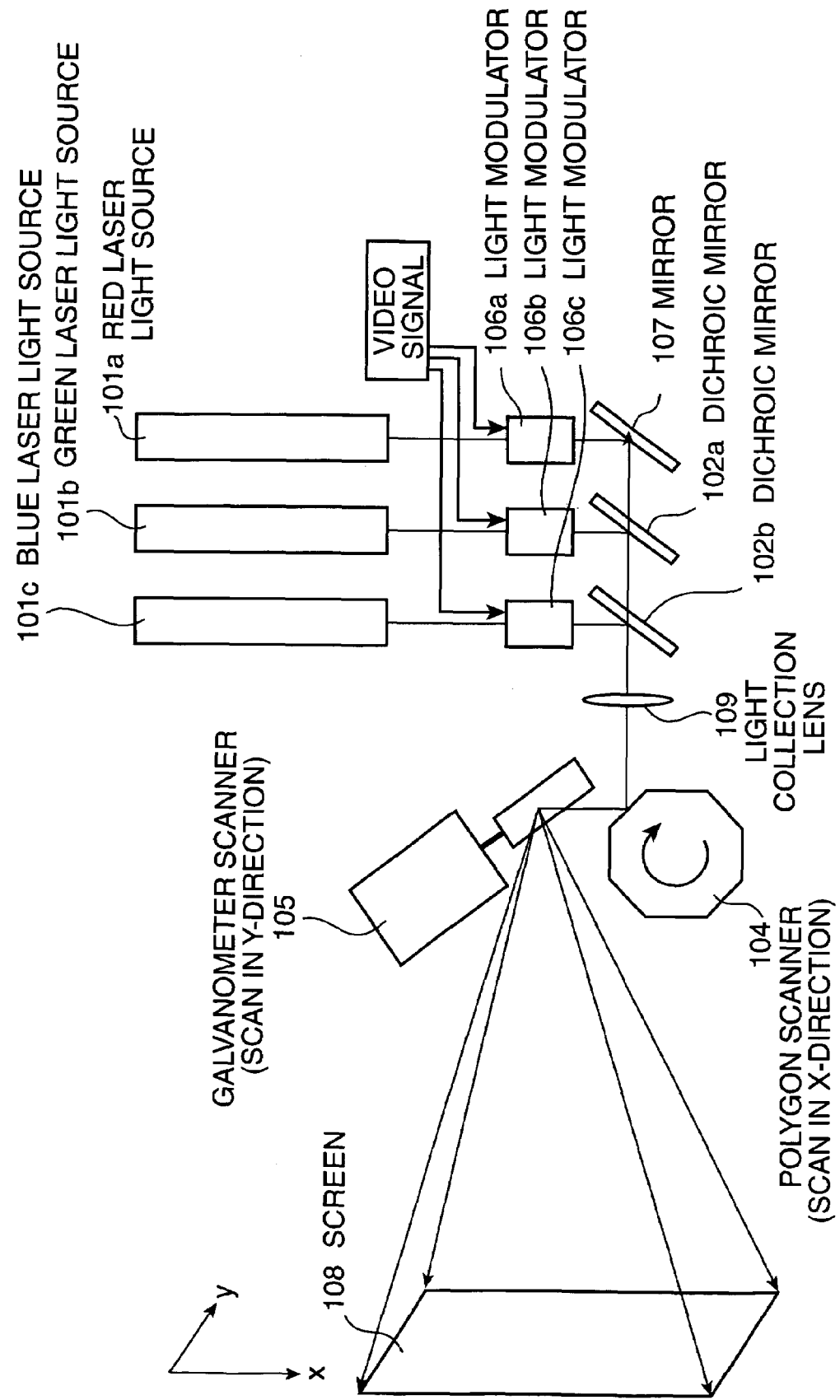
FIG. 7 is a view schematically showing the configuration of a laser 2-D image display device in the related art.

FIG. 6 is a view schematically showing a third embodiment of the 2-D image display device of the invention. In this embodiment, infrared coherent light sources 33b and 33c and wavelength conversion means 32b and 32c are used as light sources for green and blue, respectively, and green light and blue light are oscillated by beam oscillation means 3b and 3c, respectively. The infrared coherent light source 33b, the wavelength conversion means 32b, and the beam oscillation means 3b are the same as their counterparts in the second embodiment above, and the description of these components is omitted herein.

For example, a semiconductor laser having a wavelength of 850 nm is used as the infrared coherent light source 33c, and a second harmonic generator device, in which the lithium niobate substrate has the cyclic polarization inversion structure same as that in the wavelength conversion means 32b, is used as the wavelength conversion means 32c. It should be noted, however, that polarization inversion cycles are different in the wavelength conversion means 32c for blue and in the wavelength conversion means 32b for green. Blue light having a wavelength of about 425 nm exits from the wavelength conversion means 32c.

Also, as was in the second embodiment above, the red laser light source 1a is a semiconductor laser based on AlGaInP, and a high frequency current from the high frequency current superimposing means 31a is applied to a current driving this semiconductor laser. Processes after beams emitted from these coherent light sources are modulated by the light modulators 6a through 6c are the same as those in the second embodiment above, and the description of these processes is omitted herein. According to the configuration of the third embodiment as has been described, it is possible to achieve a 2-D image display device capable of displaying a sharp color image in which the speckle noises are suppressed.

While a color display device has been chiefly described, the invention is also applicable to a monochromatic system, such as an aligner for integrated circuit manufacturing. In this case, a glass mask, on which an exposure pattern is formed, is used instead of the screen, and transmitted light is further projected onto a semiconductor wafer using a reduction projection lens.

In addition, while a front-projection type display has been described, it is obvious that the invention is also applicable to a rear-projection type display device, and an illumination optical system for a display device of a type that a 2-D optical switch is illuminated from behind for the viewer to view transmitted light, like a normal liquid crystal display.

SUMMARY OF THE EMBODIMENTS

Hereinafter, the embodiments of the invention will be described briefly.

(1) As has been described, it is preferable that a 2-D image display device according to the invention of the present application includes a coherent light source, 2-D beam scan means for scanning light from the coherent light source two-dimensionally, light intensity modulation means for modulating the light from the coherent light source in intensity, and beam oscillation means for minutely oscillating the light from the coherent light source.

According to this configuration, light from the coherent light source is modulated in intensity by the light intensity modulation means according to, for example, an input video signal, and can be projected onto a certain wall or the like that functions as a screen. The projected light is scanned on the screen two-dimensionally by the 2-D beam scan means having a combination selected from, for example, a polygon scanner, a galvanometer scanner, etc. In this instance, the projected light is oscillated minutely by the beam oscillation means, and thereby irradiates different sites on the screen successively. The pattern of the speckle noises induced by scattered light therefore changes one after another as well. This allows the time-mean pattern of the speckle noises to be perceived by human eyes. It is thus possible to display a high-quality video in which are suppressed the speckle noises specific to a display device using a coherent light source, such as a laser light source.

(2) A 2-D image display device is the 2-D image display device set forth in (1), characterized by further including beam collection means for collecting the light from the coherent light source onto a screen. According to this configuration, the beam collection means enables the light from the coherent light source to be projected intact onto the screen in the form of a small spot without causing any expansion. It is thus possible to prevent spots from overlapping one another even when the amplitude of oscillation by the beam oscillation means is reduced, which in turn enables a high-quality video having less blurring to be displayed. In addition, when configured in such a manner that the beam collection means is able to control the spot diameter, the spot diameter can be controlled to match with the concavity and convexity on the screen. The 2-D image display device can be therefore used for projection onto various screens.

(3) A 2-D image display device is the 2-D image display device set forth in (1) or (2), wherein it is preferable that the beam oscillation means oscillates the light from the coherent light source in a direction perpendicular to a scan line by the 2-D beam scan means.

According to this configuration, for example, regardless of whether a scan line scanned by the 2-D beam scan means is in the horizontal direction or in the vertical direction, the beam oscillation means oscillates the light from the coherent light source in a one-dimensional direction perpendicular to the scan direction. In other words, because the beam oscillation means only has to oscillate the light in a one-dimensional direction, oscillation can be achieved with a simple configuration. Further, because the light is oscillated perpendicularly to the scan line, the light can be scanned on a two-dimensional plane efficiently. It is thus possible to display a high-quality video having no irregularities.

(4) A 2-D image display device is the 2-D image display device set forth in any of (1) through (3), wherein it is preferable that the beam oscillation means oscillates the light on the screen in amplitude equal to or larger than a spot diameter of the light collected on the screen by the beam collection means, and equal to or smaller than an interval of scan lines by the 2-D beam scan means.

According to this configuration, the beam oscillation means oscillates the light in amplitude equal to or larger than the spot diameter of the light collected on the screen. The collected light therefore irradiates different sites on the screen successively without overlapping one another. It is thus possible to display a high-quality video in which the speckle noises are suppressed effectively. Further, because the amplitude in which the collected light is oscillated is equal to or smaller than the interval of the scan lines, overlapping of videos projected on the adjacent scan lines can be controlled to be small. It is thus possible to display a high-quality video having less blurring.

(5) A 2-D image display device is the 2-D image display device set forth in any of (1) through (4), wherein it is preferable that while the 2-D beam scan means scans the light from the coherent light source comparable to one digital image data along a scan line, the beam oscillation means oscillates the light at least from largest amplitude to following largest amplitude.

Digital image data referred to herein means data corresponding to one pixel in an input video signal, which is a digital signal. Hence, a distance over which light corresponding to one digital image data is scanned along the scan line by the 2-D beam scan means corresponds to the size of the pixel on the screen in the scan line direction. In other words, the beam oscillation means oscillates the light at least from the largest amplitude to the following largest amplitude while the 2-D beam scan means scans the light over the distance comparable to one pixel on the screen. For example, assume that the scan line is in the horizontal direction, then the above description means that the light is oscillated from the highest position to the lowest position in the vertical direction in a given pixel during oscillation along the scan line, and the light is subsequently oscillated from the lowest position to the highest position in the vertical direction in the next adjacent pixel. It is preferable that the beam oscillation means oscillates the light a larger number of times while the 2-D beam scan means scans the light over the distance comparable to one pixel on the screen. As a result, the 2-D beam scan means is able to scan the light on a two-dimensional plane efficiently while suppressing the speckle noises. It is thus possible to display a high-quality video having no irregularities.

(6) A 2-D image display device is the 2-D image display device set forth in any of (1) through (5), wherein it is preferable that while the 2-D beam scan means scans the light from the coherent light source comparable to one digital image data along a scan line, the beam oscillation means oscillates the light in an non-integral multiple of one cycle.

When the beam oscillation means oscillates the light in an integral multiple of one cycle, such as one cycle or two cycles, while the 2-D beam scan means scans the light corresponding to one digital image data, there is a possibility of the occurrence of moire, which is a cyclic banded pattern. However, more will not occur when the beam oscillation means oscillates the light in a non-integral multiple of one cycle, such as 1.8 cycles. It is thus possible to display a high-quality video.

(7) A 2-D image display device is the 2-D image display device set forth in any of (1) through (5), wherein it is preferable that in a case where the light from the coherent light source is oscillated in N cycles by the beam oscillation means while the 2-D beam scan means scans the light from the coherent light source comparable to one digital image data along a scan line, a spot diameter of the light projected onto the screen is of a size equal to or larger than $1/(4N)$ of a distance over which the light is scanned by the 2-D beam scan means within the scan time.

According to this configuration, a two-dimensional plane can be fully filled out with light spots. It is thus possible to display a high-quality video having no irregularities.

(8) A 2-D image display is the 2-D image display device set forth in any of (1) through (7), wherein it is preferable that the beam oscillation means uses an electro-optic effect. According to this configuration, the beam oscillation means oscillates light not mechanically with the use of a mechanism but electrically with the use of the electro-optic effect. Oscillation can be therefore performed at a high speed in a stable manner.

(9) A 2-D image display is the 2-D image display device set forth in any of (1) through (8), wherein it is preferable that the coherent light source is formed of a blue coherent light source, a green coherent light source, and a red coherent light source. According to this configuration, light sources for respective RGB use coherent light sources for monochromatic light having adequate wavelengths. It is thus possible to achieve a 2-D image display device capable of displaying a sharp color image having high color purity.

(10) A 2-D image display device is the 2-D image display device set forth in (9), wherein it is preferable that: the blue coherent light source and the red coherent light source are semiconductor laser light sources; the green coherent light source is formed of the infrared coherent light source and light wavelength conversion means for converting a wavelength of light from the infrared coherent light source to half the wavelength; the display device further includes high frequency current superimposing means for superimposing a high frequency current on driving currents for the red coherent light source and the blue coherent light source; and the beam oscillation means is integrated into a same substrate for the light wavelength conversion means.

According to this configuration, the high frequency current superimposing means superimposes a high frequency current on driving currents for the blue coherent light source and the red coherent light source, both of which are semiconductor lasers. Hence, the spectrum bandwidth of a laser beam emitted from the semiconductor laser expands, and the coherency is reduced. The speckle noises induced from scattering on the screen can be therefore suppressed.

Also, in the green coherent light source, the wavelength of the light from the red coherent light source is converted to half the wavelength by the light wavelength conversion means. In this instance, the beam oscillation means for oscillating green coherent light is not formed as a separate mechanism component apart from the light modulation conversion means; instead, it is integrated into the same substrate for the light wavelength conversion means. This can be achieved by, for example, using lithium niobate, which is non-linear optical crystal, as the substrate, and by forming both the light wavelength converting means and the beam oscillation means in this substrate. As a result, the number of components can be reduced and the device can be more compact. When configured in this manner, it is possible to achieve a 2-D image display device capable of displaying a sharp color image in which the speckle noises are suppressed.

(11) A 2-D image display device is the 2-D image display device set forth in (9), wherein it is preferable that: the red coherent light source is a semiconductor laser light source; the green coherent light source is formed of a first infrared coherent light source and light wavelength conversion means for green for converting a wavelength of light from the first infrared coherent light source to half the wavelength; the blue coherent light source is formed of a second infrared coherent light source and light wavelength conversion means for blue for converting a wavelength of light from the second infrared coherent light source to half the wavelength; the display device further includes high frequency current superimposing means for superimposing a high frequency current on a driving current for the red coherent light source; and the beam oscillation means is integrated into a same substrate for the light wavelength conversion means for green and into a same substrate for the light wavelength conversion means for blue.

According to this configuration, the high frequency current superimposing means superimposes a high frequency current on a driving current for the red coherent light source, which is a semiconductor laser. Hence, the spectrum bandwidth of a laser beam emitted from the semiconductor laser expands, and the coherency is reduced. The speckle noises induced from scattering on the screen can be therefore suppressed. Also, in the blue coherent light source and the green coherent light source, the light wavelength conversion means converts the wavelength of light from the infrared coherent light source to half the wavelength. In other words, the wavelength of the first infrared coherent light source provided to the green coherent light source is twice the wavelength of desired green, and the wavelength of the second infrared coherent light source provided to the blue coherent light source is twice the wavelength of desired blue.

Also, the beam oscillation means for oscillating blue or green coherent light is not formed as a separate mechanism component apart from the light modulation conversion means; instead, it is integrated into the same substrate for the light wavelength conversion means. This can be achieved by, for example, using lithium niobate, which is non-linear optical crystal, as the substrate, and by forming both the light wavelength converting means and the beam oscillation means in this substrate. As a result, the number of components can be reduced and the device can be more compact. When configured in this manner, it is possible to achieve a 2-D image display device capable of displaying a sharp color image in which the speckle noises are suppressed.

(12) As has been described, an illumination light source according to the invention of the present application preferably includes: a coherent light source; beam scan means for scanning light from the coherent light source; light intensity modulation means for modulating the light from the coherent light source in intensity; and beam oscillation means for minutely oscillating the light from the coherent light source.

According to this configuration, light from the coherent light source is modulated in intensity by the light intensity modulation means according to, for example, an input video signal, and projected onto a certain screen or the like. In this instance, the beam scan means can be configured to scan the light either one-dimensionally or two-dimensionally. In the case of the configuration to scan the light one-dimensionally, by providing a mechanism that scans the light in a direction orthogonal to the scan direction to the outside, it is possible to display an image, for example, on a 2-D screen.

Also, the projected light is oscillated minutely by the beam oscillation means, and thereby irradiates different sites on the screen successively. The pattern of the speckle noises induced by scattered light therefore changes one after another as well. This allows the time-mean pattern of the speckle noises to be perceived by human eyes. It is thus possible to achieve a light source that enables display of a high quality video in which are suppressed the speckle noises specific to a display device using a coherent light source, such as a laser light source.

While the invention has been described in detail, the description above is illustrative and not restrictive in all aspects. It is therefore understood that a number of modifications that are not described herein can be anticipated without deviating from the scope of the invention.

INDUSTRIAL APPLICABILITY

The 2-D image display device of the invention is able to display a high-quality image having no speckle noises, and is applicable to a TV receiver, a projection-type data display, a home theater system, a theatrical movie projection device, and a large-screen advertisement display medium. The invention is also applicable to a manufacturing device using the photolithography, such as an aligner for integrated circuit manufacturing.

The invention claimed is:

1. A 2-D image display device comprising:
   a coherent light source;
   a 2-D beam scanner for scanning light from the coherent light source two-dimensionally;
   a light intensity modulator for modulating the light from the coherent light source in intensity based on a video signal; and
   a 1-D beam scanner for minutely oscillating the light from the coherent light source,
   wherein, while the 2-D beam scanner scans the light from the coherent light source that is comparable to one digital image data along a scan line, the 1-D beam oscillator oscillates the light from the coherent light source in a non-integral multiple of one cycle.

2. The 2-D image display device according to claim 1, wherein the 1-D beam scanner oscillates the light from the coherent light source that is displayed on a screen in an amplitude equal to or larger than a spot diameter of light collected on the screen by a beam collector, and equal to or smaller than an interval of scan lines by the 2-D beam scanner.

3. The 2-D image display device according to claim 1, wherein, while the 2-D beam scanner scans the light from the coherent light source that is comparable to one digital image data along a scan line, the 1-D beam scanner oscillates the light from the coherent light source at least from a largest amplitude to an amplitude following the largest amplitude.

4. The 2-D image display device according to claim 1, wherein the 1-D beam scanner uses an electro-optic effect.

5. An illumination light source comprising:
a coherent light source;
a beam scanner for scanning light from the coherent light source;
a light intensity modulator for modulating the light from the coherent light source in intensity based on a video signal; and
a 1-D beam scanner for minutely oscillating the light from the coherent light source,
wherein, while the beam scanner scans the light from the coherent light source that is comparable to one digital image data along a scan line, the light intensity modulator oscillates the light from the coherent light source in a non-integral multiple of one cycle.

* * * * *